United States Patent Office 3,439,769
Patented Apr. 22, 1969

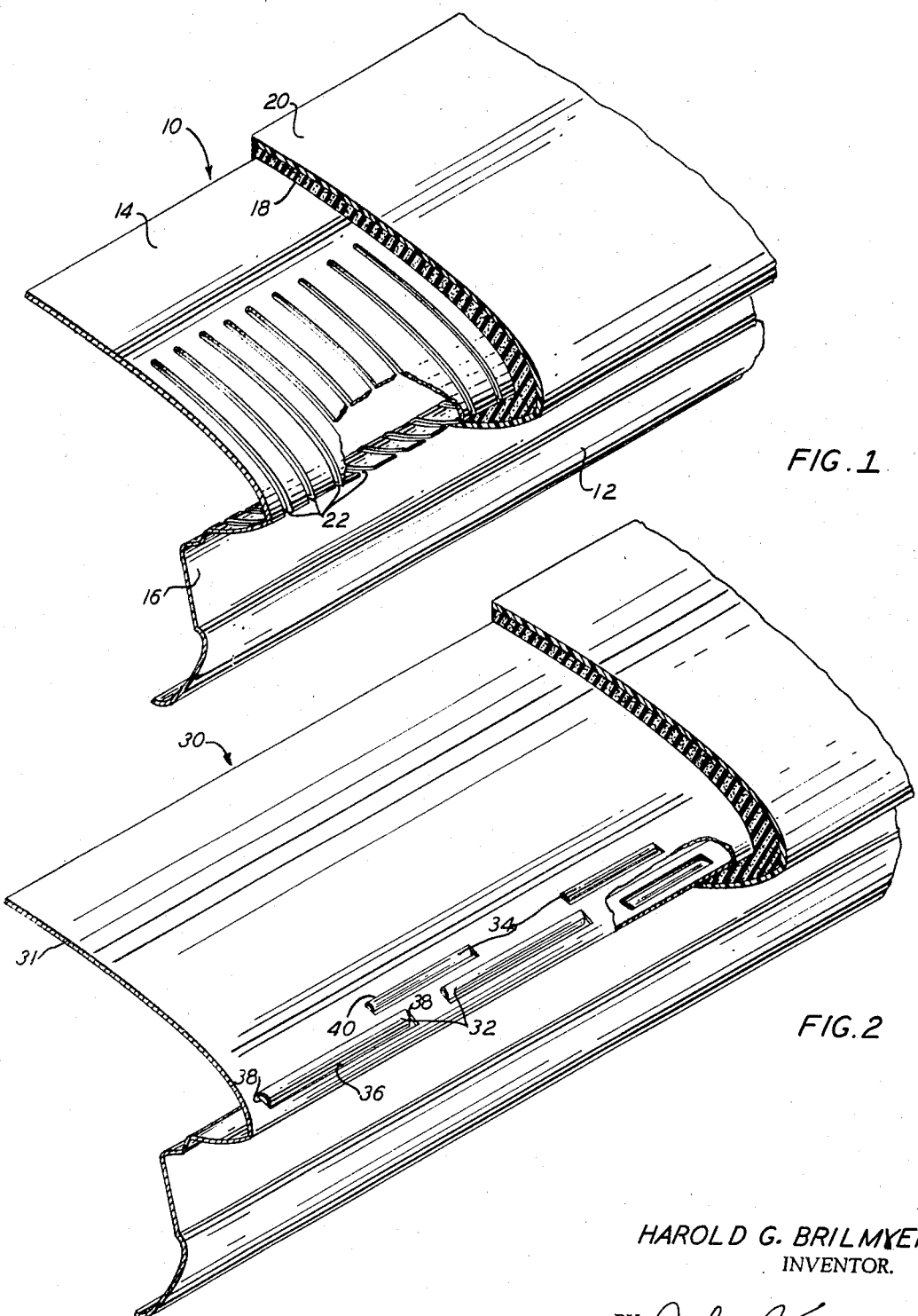

3,439,769
SAFETY INSTRUMENT PANEL
Harold G. Brilmyer, Grosse Pointe, Mich., assignor to Ford Motor Company, Dearborn, Mich., a corporation of Delaware
Filed May 2, 1966, Ser. No. 546,741
Int. Cl. B60k 37/00; B62d 25/14; B60r 21/04
U.S. Cl. 180—90                         2 Claims

ABSTRACT OF THE DISCLOSURE

An instrument panel for a motor vehicle formed from steel sheet and having sufficient strength characteristics to serve as a structural member in the vehicle body assembly. Slot means extend through the panel at areas subject to impact from a body portion of a vehicle passenger during a vehicle collision. These slot means weaken the structural resistance of the sheet to deformation at the selected areas and thereby promote the dissipation of impact energy.

---

This invention relates to a safety instrument panel for a motor vehicle.

Tests have shown that the so-called "secondary collision," that is the collision between a motor vehicle passenger and his environmental surroundings, is a greater source of bodily injury than the so-called primary collision of the motor vehicle with some impedance. A common injury causing impact during this secondary collision is between the head of a vehicle passenger and the vehicle instrument panel that extends across the front of the passenger compartment. This is especially true when the passenger is employing a seatbelt, which causes a jack-knifing motion of the passenger's body upon collision.

To lessen the force of the impact between the vehicle passenger's head and the instrument panel, present day automotive instrument panels are covered with an energy absorbing padding. However, such padding is limited in the amount of energy that it can absorb.

Safety experts have recommended that the force of impact with a vehicle instrument panel should not exceed 80 times the force of gravity (G's) measured for a head form weighing fifteen pounds and swinging through an arc at a velocity of 22 ft. per sec. It has been proposed, in order to reduce the impact force below 80 G's, to manufacture the instrument panel from a material that will deform readily on impact, thus absorbing energy. However, a motor vehicle instrument panel performs a structural support function contributing to necessary vehicle body rigidity and strength, and cannot, therefore, be fabricated from the material so readily deformable that this support function would be impaired.

It is, therefore, the object of the present invention to provide a motor vehicle instrument panel constructed from a material of sufficient strength to perform the requisite structural support function while being capable of sufficient deformation upon impact to contribute substantially to the safety of the vehicle passenger.

To accomplish this object, this invention provides a safety instrument panel comprising a stylized elongate length of sheet material having sufficient strength to perform the desired structural support function. This sheet material has formed therethrough a plurality of adjacent slot means at areas subject to impact from a body portion of a vehicle passenger during a vehicle collision. These slot means weaken the structural resistance of the sheet material to deformation at the selected areas and thereby promote the dissipation of energy.

This and other objects and advantages of the invention readily will become apparent when the following description is considered in conjunction with the accompanying drawing wherein:

FIGURE 1 is an isometric view of a portion of a safety instrument panel constructed in accordance with this invention and having part cut-away and part in section; and FIGURE 2 is a view similar to FIGURE 1 and illustrating a second embodiment of the safety instrument panel of this invention.

Referring to FIGURE 1, the numeral 10 denotes a safety instrument panel constructed of a stylized length of sheet material 12 having a top surface 14 and a front surface 16. Padding 18, covered by skin material 20 such as vinyl, covers that portion of panel 10 facing the vehicle passenger compartment.

Tests have shown that the area of an instrument panel most likely to be impacted by the head of a vehicle passenger is that portion near the intersection of the top surface 14 and front surface 16. Formed in this area are a plurality of parallel slots 22 extending through sheet material 12. Slots 2 are oriented substantially perpendicularly to the longitudinal axis of the instrument panel 10.

Slots 22 provide for a weakening of resistance to deformation of sheet material 12 over selected areas of the instrument panel without impairing the structural rigidity of the entire instrument panel. Upon impact of the head of the vehicle passenger with the instrument panel 10 in an area wherein are formed slots 22, deformation of sheet material 12 readily occurs. The indentation formed tends to conform to the shape of the object impacted against the instrument panel. For instance, an arcuate head form impacting the instrument panel 10 would cause a progressive deformation of adjoining slot-separted sheet sections. The impact forces are thus distributed over a large area, thereby reducing the force of impact at any particular point. Also, the deformation of the sheet material 12 absorbs large amounts of impact energy.

It should be obvious that any number of slots 22 may be formed in sheet metal 12. Preferably, a sufficient number of slots should be formed to provide selective weakening of the panel 10 over likely impact areas without impairing the structural integrity of the panel 10 as a whole.

FIGURE 2 illustrates a second embodiment of this invention comprising the instrument panel 30 constructed of sheet material 31. Two rows of louvers 32 and 34 are formed in the top surface of instrument panel 30 over the area where the instrument panel is likely to be impacted by the head of a vehicle passenger. Similar rows of louvers are formed in the front surface of the instrument panel.

Each louver consists of a rectangular section of the sheet material 31 that is cut through along a front portion 36 and side portions 38. This permits a portion of sheet material 31 to be bent inwardly along the rear surface 40 of the rectangle, thereby forming a louver. The louvers of the row 34 are located so as to be laterally aligned with and adjacent to the spaces between the louvers of row 32.

The arrangement of louvers described above and illustrated in FIGURE 2 also provides for a selective weakening of sheet material 31 to deformation with the attendant advantages described above. Such louvering decreases the force of impact as defined above from 110 G's to 60 G's for conventional dash panel sheet material.

I claim:

1. A safety instrument panel partially defining the passenger compartment of a motor vehicle, said panel comprising a stylized elongate length of sheet-like material, plural adjacent slot means formed through said material at areas subject to impact with a vehicle passenger during a collision and promoting the dissipation of impact energy by weakening the resistance of said panel areas to deformation, and padding secured to said materials and covering said areas, said slot means consisting of spaced essentially parallel slots extending through said material and located substantially normal to the longitudinal axis of said panel.

2. A safety instrument panel partially defining the passenger compartment of a motor vehicle, said panel comprising an elongate stylized length of sheet material being arcuately curved in a direction transverse to its longitudinal axis, and slot means formed over the curved surface of said material and weakening the structural integrity of said material to deformation, said slot means consisting of two rows of spaced elongate louvers, the louvers of each row located in end to end relationship parallel to the longitudinal axis of said sheet material, the louvers of one row being adjacent to and spaced between the louvers of the other row.

References Cited

UNITED STATES PATENTS

| 3,130,807 | 4/1964 | McHenry | 180—90 |
| 3,167,974 | 2/1965 | Wilfert | 74—492 X |
| 2,070,760 | 2/1937 | Straith | 280—150 |
| 2,845,144 | 7/1958 | Bohn. | |
| 2,904,122 | 9/1959 | Nordrum et al. | 180—90 |

FOREIGN PATENTS

| 378,701 | 7/1964 | Switzerland. |
| 1,424,724 | 12/1965 | France. |

KENNETH H. BETTS, *Primary Examiner.*

U.S. Cl. X.R.

280—150